(12) United States Patent
Happel

(10) Patent No.: US 8,034,234 B2
(45) Date of Patent: Oct. 11, 2011

(54) FLOATING SKIMMER APPARATUS WITH UP-FLOW FILTER

(76) Inventor: Thomas H. Happel, Cocoa, FL (US)

( * ) Notice: Subject to any disclaimer, the term of this patent is extended or adjusted under 35 U.S.C. 154(b) by 220 days.

(21) Appl. No.: 12/587,574

(22) Filed: Oct. 13, 2009

(65) Prior Publication Data

US 2010/0032363 A1 Feb. 11, 2010

Related U.S. Application Data

(63) Continuation-in-part of application No. 12/387,583, filed on May 6, 2009, which is a continuation-in-part of application No. 12/315,820, filed on Dec. 8, 2008, now Pat. No. 7,846,327.

(60) Provisional application No. 61/009,086, filed on Dec. 27, 2007.

(51) Int. Cl.
*E03F 5/14* (2006.01)

(52) U.S. Cl. ........ 210/121; 210/155; 210/156; 210/162; 210/170.03; 210/254; 210/305; 210/311; 210/538

(58) Field of Classification Search .......... 210/121, 210/122, 155, 156, 162, 170.03, 242.1, 254, 210/299, 305, 306, 311, 521, 532.1, 538
See application file for complete search history.

(56) References Cited

U.S. PATENT DOCUMENTS

| | | | | |
|---|---|---|---|---|
| 5,378,376 A * | 1/1995 | Zenner | .......... | 210/122 |
| 6,183,633 B1 * | 2/2001 | Phillips | .......... | 210/170.03 |
| 6,478,954 B1 * | 11/2002 | Turner et al. | .......... | 210/162 |
| 6,719,912 B2 * | 4/2004 | Seidl | .......... | 210/162 |
| 6,797,161 B2 * | 9/2004 | Use et al. | .......... | 210/305 |
| 6,869,525 B1 | 3/2005 | Happel | | |
| 7,153,417 B2 * | 12/2006 | Happel | .......... | 210/162 |
| 7,291,262 B2 * | 11/2007 | Matsui et al. | .......... | 210/170.03 |
| 7,294,256 B2 | 11/2007 | Happel | | |
| 7,846,327 B2 * | 12/2010 | Happel et al. | .......... | 210/155 |
| 2010/0078370 A1 * | 4/2010 | Happel | .......... | 210/122 |
| 2010/0230338 A1 * | 9/2010 | Happel | .......... | 210/170.03 |

* cited by examiner

*Primary Examiner* — Christopher Upton
(74) *Attorney, Agent, or Firm* — William M. Hobby, III

(57) ABSTRACT

The present invention is a storm water filter system for filtering floatable debris and non-floating pollutants from storm water passing through a storm water drain system. The storm water filtering system has a floatable skimmer therein for capturing floatable debris and trash from the storm water and a separate filtration system to filter non-floatable pollutants from water passing therethrough.

12 Claims, 4 Drawing Sheets

FLOATING SKIMMER APPARATUS WITH UP-FLOW FILTER

CROSS-REFERENCES TO RELATED APPLICATIONS

This patent application is a continuation-in-part application of my pending U.S. patent application Ser. No. 12/387,583, filed May 6, 2009 for a Storm Water Filter System Having a Floating Skimmer Apparatus; which is a continuation-in-part of U.S. patent application Ser. No. 12/315,820, filed Dec. 8, 2008, now U.S. Pat. No. 7,846,327 for a Storm Water Filter System Having a Floating Skimmer Apparatus; and which claims the benefit of U.S. provisional patent application Ser. No. 61/009,086, filed Dec. 27, 2007 for a Floating Skimmer Apparatus.

BACKGROUND OF THE INVENTION

The present invention is a storm water filter system for filtering floatable debris and non-floating pollutants from storm water passing through a storm water drain system and more specifically, the present invention is directed towards a storm water filtering system having a floatable skimmer therein for capturing floatable debris and trash from the storm water and separate filtration of non-floatable pollutants from water passing therethrough.

Federal clean water requirements require that water bodies such as lakes and rivers meet strict minimal water quality specifications. To achieve this end, storm water drainage pipes often require treatment before conveying storm water into receiving water bodies. As a result, a wide variety of technologies have been developed to treat storm water and improve the water quality.

A common variety of storm water treatment systems are hydrodynamic separators such as baffle boxes and vortex systems. Hydrodynamic separators can treat relatively large water flows and are good for removing solids that are relatively large in size. Hydrodynamic separators do very little to remove the dissolved pollutants and have a typically poor removal efficiency for fine particles.

To achieve water treatment beyond what can be accomplished by a hydrodynamic separator, another class of storm water treatment systems commonly referred to as filtration systems are used. Filtration systems typically will pass the water flow through a filter media such as sand, zeolite, activated carbon, and the like. Filter media is typically selected to do more than remove solids from the water flow. Depending on the pollutants of concern, filter media can be selected to remove specific dissolved pollutants such as nutrients, metals, or a wide variety of chemical contaminates. However, a problem with using filter media in a storm water treatment system is the significant influence of friction between the water and the media. In addition, changing the direction of water flow as it passes through a filtration system reduces the kinetic energy of the water flow which will reduce the volume water flow. During big rain events a storm water filtration system in a storm water pipe can significantly inhibit the passage of water and cause flooding upstream from the filtration system. If the filtration system becomes clogged with debris the water flow can be completely stopped.

The purpose of the present invention is to be able to treat the storm water flow with a storm water filtration system that is resistant to clogging, yet be able to pass large water flows during large rain events. In this way filter media can be incorporated into the treatment of storm water without the potential of flooding upstream caused by the filtration system.

The invention can be described as a vault that contains a floating skimmer system with an up-flow filtration system. The skimmer system portion of the invention will be positioned in line with the water flow and will divert the water flow through the filtration system. The water flow will then flow through the filter where it is treated by the media. Once the water flow has passed through the filter it will continue down stream. During large rain events that cause the water levels within the invention to rise, the floating skimmer will also rise and allow water to flow under the skimmer and by-pass the filter by-pass the filtration treatment.

The invention has two primary components that work in concert with each other. The floating skimmer system acts to direct the water flow down toward the underside of the skimmer and through the filter during low to medium flow rates. During large flow rates the floating skimmer reacts to allow the high flow rates to pass straight ahead through the vault with minimal friction. The up-flow filter provides treatment to the water flow during low to medium flow rates and is resistant to clogging due to its design and nature.

In the present invention a relative short floating skimmer is used and has the same performance of a much taller fixed skimmer without the head loss associated with a taller skimmer by opening up a larger passageway under the skimmer. A storm water treatment structure that makes use of a floating skimmer can be more easily retrofitted to an existing water shed storm drain system due to the minimal head loss of the shorter skimmer.

In my prior U.S. Pat. No. 6,869,525 for a Storm Drain Filter System I show a storm drain filter system which includes a skimmer for collecting floating hydrocarbons and for absorbing the hydrocarbons in a hydrocarbon absorbing boom while preventing them from passing out of the skimmer. In my prior U.S. Pat. No. 7,294,256 for a Storm Water Filter System, a storm water filter system is provided for filtering storm water being fed into an in-ground well and uses a fixed skimmer to prevent floating organic debris from entering the discharge into the in-ground recharge well.

SUMMARY OF THE INVENTION

The present invention is a storm water filter system for filtering floatable debris and non-floating pollutants from storm water passing through a storm water drain system. The storm water filtering system has a floatable skimmer therein for capturing floatable debris and trash from the storm water and a separate filtration system to filter non-floatable pollutants from water passing therethrough. The storm water filter system has a housing having a chamber therein having an inlet and an outlet. A skimmer frame having a pair of side tracks is mounted to said housing inside the housing chamber between the inlet and outlet. A skimmer panel has a top and a bottom and is movably mounted in the skimmer frame tracks and positioned to form a passageway under the bottom of the skimmer. A filter element is attached to the skimmer frame below the skimmer panel for passing storm water therethrough. Storm water is forced under the bottom of the floatable skimmer panel and through the filter element while blocking floatable debris from entering the housing chamber outlet until the skimmer panel is raised by the water level to allow water flow under the skimmer panel while bypassing the filter to allow a smoother flow of water through the system during peak flows.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
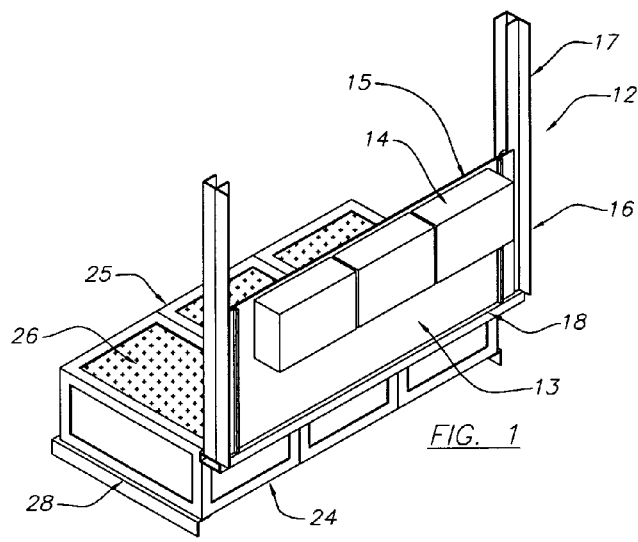
FIG. 1 is a perspective view of a floatable skimmer apparatus with up-flow filter.
Figure 3:
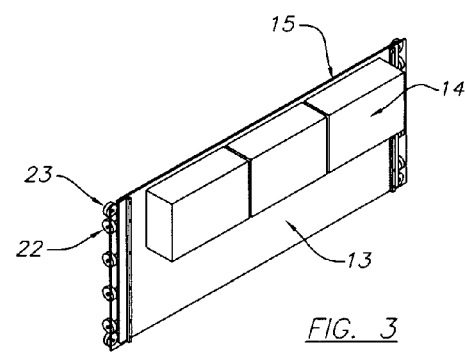
FIG. 3 is a perspective view of the floating skimmer portion of FIGS. 1 and 2.
Figure 2:
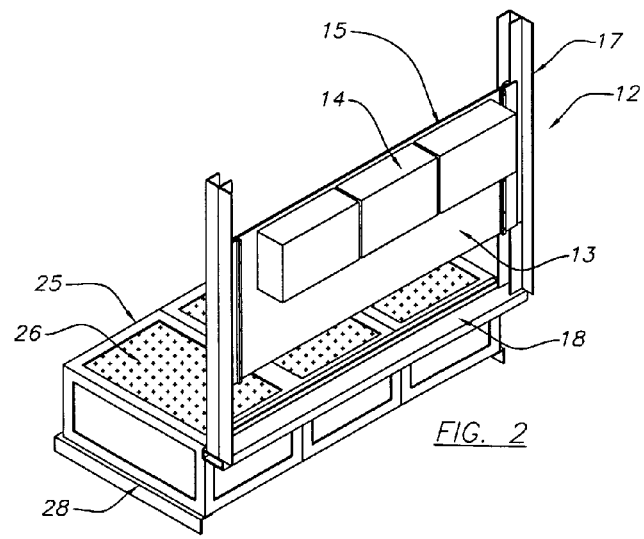
FIG. 2 is a perspective view of the up-flow filter and skimmer apparatus of FIG. 1 having the skimmer in a floated position.

Referring to the drawings, FIGS. 1 through 8, a filtering system 10 has a box or vault 11 having a skimmer and filter system 12 having a floatable skimmer 13 with a skimmer panel 13 having a plurality of floats 14 attached therein but spaced from the panel 13 with a space 15. The skimmer panel 13 is movably mounted in the frame 16 pair of tracks 17. The frame also has a support beam 18. The vault has an inflow side or inlet 20 and an outlet 21 as seen in FIGS. 4 through 8.

The skimmer panel 13 is rigid and is typically made from either fiberglass, plastic or metal. The skimmer panel 13 floats 14 are attached to the inflow side of the vault to create the buoyancy to enable the skimmer panel 13 to float up with a rising water levels in the vault 10. The floats 14 are spaced off the face of the in-flow side of the skimmer panel 13 so that water can surround the floats on all sides which will create buoyant lift. Typically, the floats 14 are made of rotomolded plastic and then bolted to the in-flow side of the skimmer panel 13. Because the floats 14 are positioned on the in-flow side of the skimmer panel and spaced off the skimmer panel, the buoyancy and vertical positioning of the skimmer panel is dependent only on the in-flow side of the skimmer panel 13. If there is no water against the out-flow side of the skimmer panel 13, the skimmer panel could still float depending only on the water level on the in-flow side. The skimmer panel 13 is a front side buoyancy skimmer because all the buoyancy required to enable the skimmer panel 13 to float is due to the floats 14 attached to the front side of the skimmer panel 13.

The skimmer panel 13 has a plurality of load rollers or wheels 22 which allow the skimmer panel 13 to move vertically in the tracks 17 with minimal friction. At the top and bottom corner of each end of the skimmer panel 13 is a centering roller 23 which prevents friction between the skimmer panel and the side walls of the vault 11. The load rollers are located between the top and bottom of each end of the skimmer panel 13. The load rollers 22 supports the panel 13 against the force of the water entering the vault 11 and prevents friction between the tracks 17 and the skimmer panel 13. The rollers have a low friction design and may be made of Delrin mounted stainless steel axles.

The skimmer panel 13 has a seal on each side thereof to prevent the passage of lighter than water liquids such as oils. The seals will be typically be made out of either plastic or rubber and be resistant to chemicals and are tensioned to press against the up-flow side of the tracks 17. Hydrocarbon absorbent media 29 can be floated in front of the skimmer panel 13 to collect oils that enter the vault 11 as shown in FIGS. 4 through 8.

The support beam 18 spans the width of the vault 11 between each vertical track member 17 that acts as a landing for the skimmer panel 13 when it is not floating and is in its resting or lower position. Each vertical track 17 is attached to a side wall of the vault 11. The roller system on each end of the skimmer panel 13 fits within the track 17. If the skimmer panel begins to float and move up vertically, the tracks will guide the skimmer panel.

During low to medium flow rates the floating skimmer panel 13 directs the water flow downward toward the underside of an up-flow filtration system 24. The up-flow filtration system has a frame 25 having absorbent media filters 26 supported therein. There is a space 27 between the bottom of the up-flow filtration system 24 and the floor of the vault 11 spanning the width of the vault. The space allows water to pass under and through the filters 26 and allows debris that may have been collected on the outside of the filters to settle when water is not flowing therethrough.

The hydraulic grade line on the in-flow side of the skimmer panel 13 is higher than the hydraulic grade line on the out-flow side of the skimmer panel 13, water flow is forced up through the up-flow filters 26. As water flow passes through the media in the up-flow filters, the contaminates contained in the water are reduced. Once the water flow exits the top of the up-flow filter it will flow out the outlet 21 of the vault 11. The filter frame 25 is hinged to the support beam 18 and rests on a filter support members 28.

The media in the up-flow filter is contained in a housing which may include the frame portion 25 having the generally rigid screen 26 on the top and bottom. The water enters the bottom of the up-flow filter 24 and exits the top. The screen 26 used on the top and bottom of the up-flow filter is sized so that the openings in the screen are smaller than the particulate of the media. The filter media is typically heavier than water so that it sinks to the bottom of the up-flow filter. When there is no water flowing there is a space between the top of the media in the up-flow filter and the top screen. This void space between the media and the top screen enables the media to move and churn when water is flowing. This churning with flowing water aids in preventing the media from clogging.

A wide variety of filter media is readily available in the market place. The selection of the desired filter media is typically determined by targeting treatment with regard to the pollutants of concern. Some types of media come in a sheet form rather than a particulate. For an up-flow filter where the media is in sheet form there will be no void space between the media and the top screen of the up-flow filter housing.

The filter frame 25 is hinged to the support beam 18 or is removable from the support beam for access to the media in order to replace or do maintenance to the media. The entire up-flow filter system is hinged to allow access to the space below the up-flow filter. Servicing the space 27 below the up-flow filter includes vacuuming the vault to remove solids that have settled on the floor of the vault.

Figure 4:
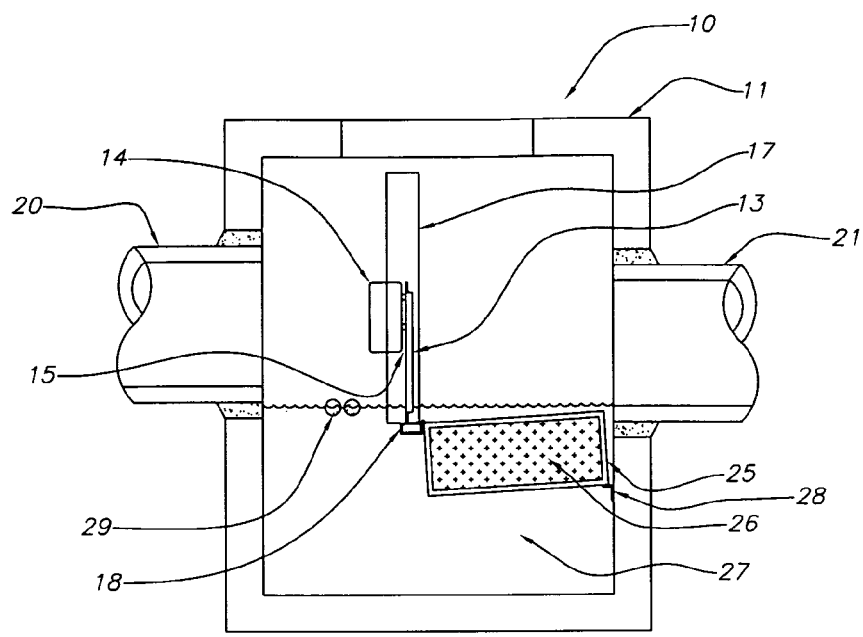
FIG. 4 is a side elevation of the up-flow filter and skimmer apparatus of FIGS. 1 and 2.
Figure 5:
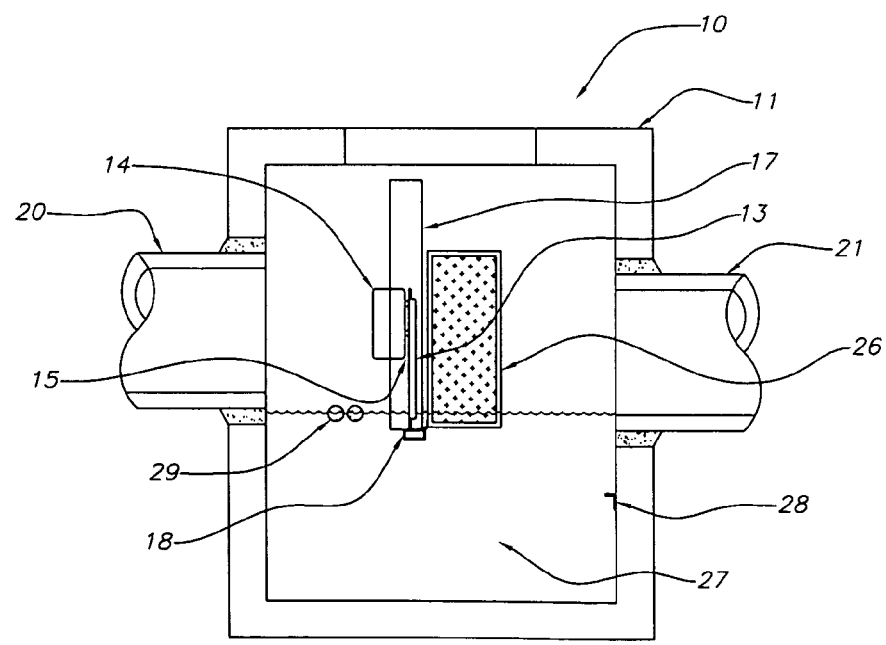
FIG. 5 is a side elevation of the up-flow filter and skimmer of FIGS. 1 and 2 having the up-flow filter raised for service.
Figure 6:
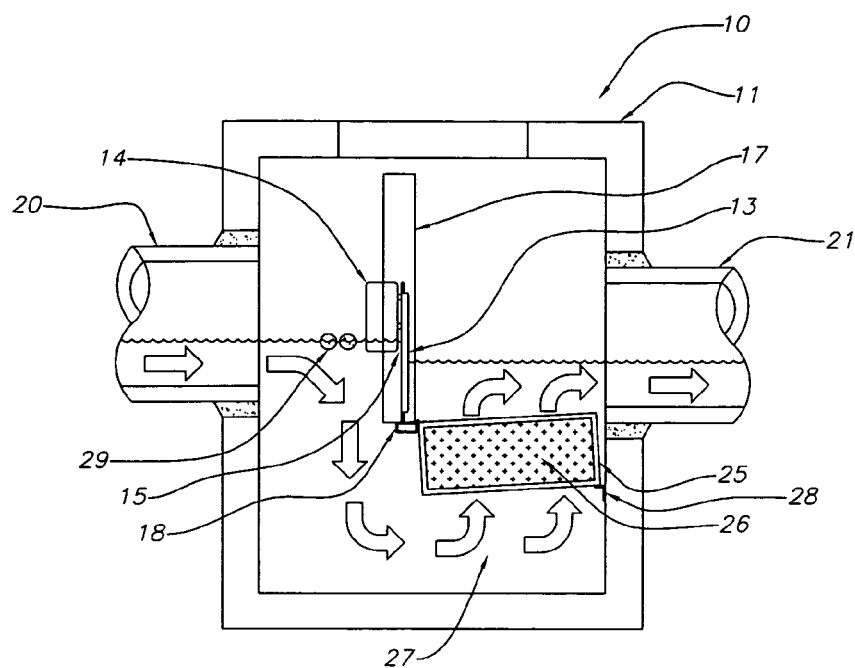
FIG. 6 is a sectional view taken through the floatable skimmer and up-flow filter of FIGS. 1 through 5.
Figure 7:
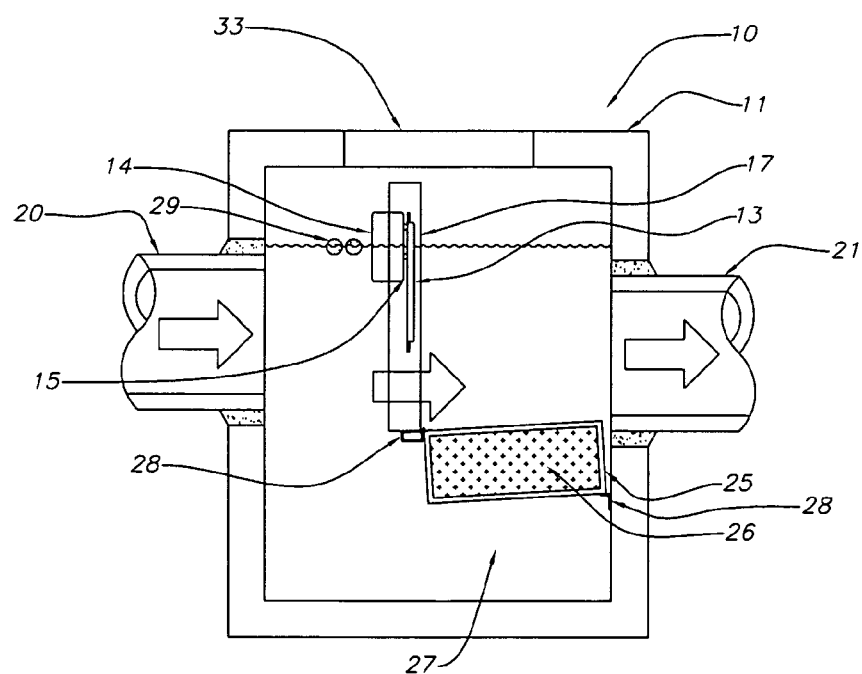
FIG. 7 is a side sectional view of the up-flow filter and floatable skimmer apparatus of FIGS. 1 through 6 with the skimmer raised by the high water level.
Figure 8:
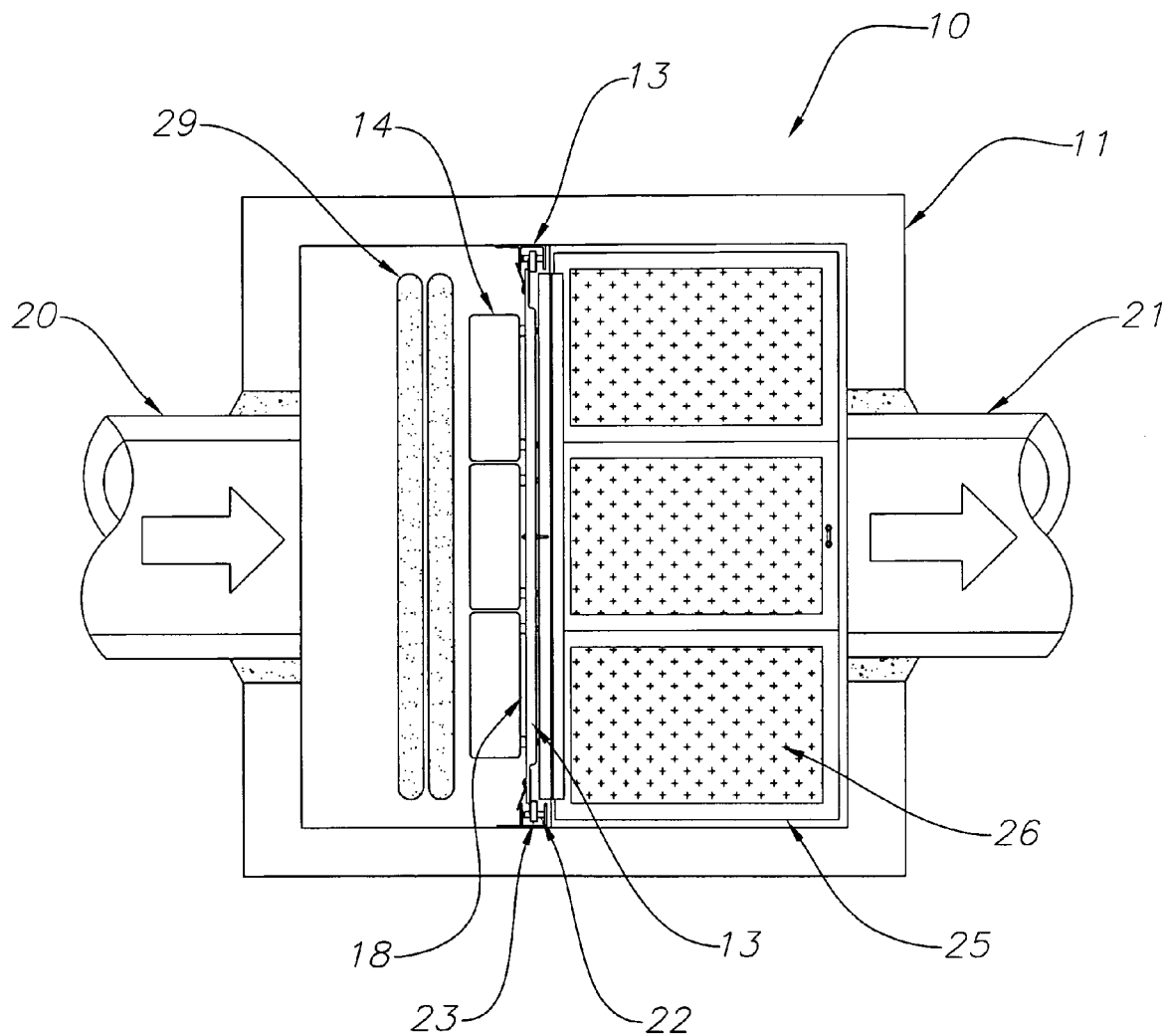
FIG. 8 is a top sectional view of the up-flow filter and floatable skimmer of FIGS. 1 through 7.

The operation of floating skimmer and up-flow filter apparatus can be seen in connection with FIGS. 4 through 7. FIG. 4 illustrates a no flow condition with the hinged up-flow filter system filter resting in the water while FIG. 5 shows the filter system 24 raised for servicing the vault 11 area beneath the filter. FIG. 6 shows the vault 11 during a low flow of storm water therethrough which is the more normal condition with all the skimmer panel resting on the support beam 18 and all the storm water passing through the up-flow filter 24. The high flow of water in FIG. 7 has raised or floated the skimmer into a raised position to open an overflow passageway beneath the skimmer panel 13 and above the up-flow filter 24. FIG. 8 shows a top sectional view of the filter system.

It should be clear at this point that during small to medium rain events the floating skimmer system 12 will direct the water flow down toward the under side of the up-flow filter 24. As water passes up through the up-flow filter 24 contaminates are removed from the water and retained in the media. Depending on the type of contaminate, micro-organisms can consume the contaminates between rain events through a process known as consumption or predation. This aids to free up and make available the media surface for the next rain event. Large solids such as leaves can collect on the bottom of up-flow filter screen 26 but are prevented from entering the media by a screen across the bottom. After the rain event is over the solids collected on the bottom of the up-flow filter 24 will fall away and settle on the bottom of the vault 11. During large rain events the hydraulic grade line on the in-flow side of the skimmer panel 13 will rise high enough to enable the skimmer to float and move up vertically while being guided by tracks 17. A roller system on each end of the skimmer panel eliminates friction between the skimmer panel 13 and the tracks 17, and enables free vertical movement of the skimmer panel 13. As the panel rises less water is diverted toward the bottom of the up-flow filter 24. During a peak flow rain event the floating skimmer panel will rise high enough to allow all the water flow to by-pass the filtration process and flow straight ahead out the outlet 35. During peak flow conditions the floating skimmer 12 and up-flow system 24 will have almost no impact on the water flow or the potential for flooding upstream. As the large rain event diminishes the floating skimmer 13 will settle back down onto its landing and the up-flow filtration system will resume treating the water flow.

It should be clear at this time that a floatable skimmer for a storm water system has been provided which advantageously allows the capture of floatable debris and hydrocarbons in the entering storm water while allowing a larger channel for the passage of the storm water by the skimmer and through a filter for removing pollutants before going into the outlet of the storm water filter vault. However, the present invention is not to be limited to the forms shown which are to be considered illustrative rather than restrictive.

I claim:

1. A storm water filter system comprising:
   a housing having a chamber therein having an inlet thereinto and an outlet therefrom;
   a skimmer frame mounted in said housing chamber between said inlet and outlet;
   a skimmer panel having a top and a bottom and being movably mounted in said skimmer frame and positioned to form a passageway under the bottom thereof;
   at least one floatation member mounted on said skimmer panel to allow said skimmer panel to rise and fall in said skimmer frame with the rise and fall of storm water in said housing chamber from a rest position having said skimmer panel resting on said frame to a raised position holding the top of said skimmer panel above the water level in said housing chamber and opening a passageway therebeneath as the water level rises in said housing chamber above a predetermined level; and
   a filter element attached to said skimmer frame below said skimmer panel for passing storm water therethrough;
   whereby storm water is forced under the bottom of said floatable skimmer panel and through said filter element while blocking floatable debris from entering said housing chamber outlet while opening an overflow passageway bypassing said filter element when said skimmer panel is floated to a raised position.

2. The storm water filter system of claim 1 having a plurality of floatation members attached to said skimmer panel.

3. The storm water filter system of claim 2 in which each floatation member is attached to said skimmer panel on the inlet side of said skimmer panel.

4. The storm water filter system of claim 3 in which each said floatation member is attached to said skimmer panel and spaced therefrom to allow water between said floatation member and said skimmer panel.

5. The storm water filter system of claim 4 in which each said filter element is hingedly attached to said skimmer frame.

6. The storm water filter system of claim 5 in which said skimmer frame has a support beam connecting a pair of vertical tracks having said skimmer panel movably mounted therein.

7. The storm water filter system of claim 6 in which said filter element is supported in a filter frame which is hinged to said support beam.

8. The storm water filter system of claim 7 having at least one filter element support bar holding said hinged filter element in place.

9. The storm water filter system of claim 8 in which said skimmer panel has a plurality of rollers on each side thereof riding in each side of said vertical track.

10. The storm water filter system of claim 9 in which said plurality of rollers on each side of said skimmer panel includes a plurality of load rollers to support said moving skimmer panel against the force of water bearing thereagainst.

11. The storm water filter system of claim 10 in which said skimmer panel plurality of rollers includes two centering rollers on each side thereof.

12. The storm water filter system of claim 11 having at least one hydrocarbon absorption boom position in said chamber on the inlet side of said skimmer panel.

* * * * *